Patented Nov. 28, 1939

2,181,433

UNITED STATES PATENT OFFICE 2,181,433

GAS PURIFICATION

Claude W. Jordan, Paoli, Pa., assignor to The United Gas Improvement Company, a corporation of Pennsylvania No Drawing. Application October 20, 1937, Serial No. 169,990

7 Claims. (Cl. 252—2.5)

This invention pertains broadly to the removal of undesirable substances from manufactured gas and pertains particularly to the removal of substances such as hydrogen sulfide and hydrocyanic acid by what is known as dry purification as distinguished from liquid purification.

In dry purification it is common practice to remove substances of the above character from the gas by passing the gas through a series of boxes filled with a mixture of iron oxide and wood shavings or other bulk inert material. Small amounts of ammonia are often added or left in the gas to assist in the removal of the hydrocyanic acid.

The active material in such process is probably not iron oxide itself but iron oxide combined and/or otherwise associated with water. For instance, it is a standard practice to have the iron oxide-wood shavings mixture contain about fifty per cent by weight of water.

Whether the water is chemically combined in whole or merely in part with the iron has not been definitely determined, but it is safe to assume that all of the water is not so combined. On the other hand the failure of previous attempts to reactivate dried oxide by water or steam spraying definitely demonstrates that the mere presence of water is not sufficient for purification purposes.

Improved methods for the recovery of by-products from gas as well as improved handling methods have lowered the water content of the gas so that the gas in many instances is no longer saturated with water. It is therefore capable of taking up water from the purification mixture, thus drying the same.

Furthermore the heat generated during purification raises the temperature of the gas with the result that the capacity of the gas to absorb water is considerably increased.

During the summer months absorbed solar radiation may also be a factor in raising the gas temperature.

It is quite well established that the activity of iron oxides for purification purposes is affected by water content. Some oxides are useful over a narrow range of water content only, whereas other oxides continue almost constant in activity while the moisture content may increase several hundred per cent.

However, if an oxide becomes dried, for instance, by the passage of dry gases therethrough, it has heretofore been extremely difficult to restore its activity by remoistening. The higher the temperature at which the oxide has been dried the more resistant it is to reactivation by water.

A dehydrated oxide that has been sulfided in the normal course of the purification process and then subjected to standard revivification procedure, such as moistening in the presence of air, resumes the dehydrated state upon revivification even in the presence of water.

Previous attempts to rehydrate the oxide in situ, or to maintain a hydrated condition in situ by adding steam or water fog to the gas ahead of the purifiers or by spraying water over the oxide in the purifying boxes, have not been successful in restoring the activity of the oxide.

My experiments lead me to believe that the activity of the oxide in the presence of moisture is largely dependent upon adsorption phenomena, and that the failure of water and steam spraying methods as heretofore practiced has been largely due to the establishment of an improper physical and/or chemical relationship between the oxide and the added moisture.

It appears that the water originally moistening fresh oxide adheres to the oxide as the result of phenomena involving adsorption and that such water when once removed is not capable of being restored without resort to some special agent capable of effecting the desired relationship between water and oxide.

It is possible that deposits of free sulfur or of traces of high boiling organic compounds, or deposits of other substances by the gas so modifies the surface chemistry at the oxide-water interface that added water by itself is not capable of combining either physically or chemically with the oxide as may be required to bring the oxide to a reactivated state.

I have discovered that the addition of a small quantity of a wetting agent to water brought into contact with the oxide in the purifying boxes is sufficient to cause reactivation of the oxide.

I find, for instance, that of the order of 0.1% to 0.2% or more by weight of wetting agent added to water sprayed into the purifying boxes is sufficient to cause the oxide to become uniformly rehydrated.

Such spraying may take place without interrupting the flow of gas through the purifiers if desired.

It is extremely difficult to assign a definite chemical composition to the various wetting agents that may be used. This is particularly true of wetting agents made from mineral oil sulphonic acids.

Chemically, wetting agents may be divided into four classes as follows:

1. Those derived from hydrocarbons,
2. Those derived from alcohols,
3. Those derived from acid esters,
4. Those derived from amides.

The most important of the hydrocarbon derivatives are marketed under the commercial names of Nekal, Alkanol, and Neomerpin. They are made by condensing beta naphthalene sulfonic acid with alcohols consisting of three or more carbon atoms such as isopropanol, butanol, etc.

Derivatives of alcohols are made by treating the higher alcohols with sulfuric acid to give esters. When the esters are neutralized with sodium compounds they have the general formula, $RCH_2OSO_3Na$ in which R stands for an alkyl group.

As an example wetting agents known commercially as the Gardinols are derived from lauryl alcohol, myristyl alcohol and oleyl alcohol, while those known as Avirols are derived from palmityl alcohol and stearyl alcohol.

The fatty acid ester derivatives may be represented by the formula $RCOC_2H_4SO_3Na$ in which R stands for an alkyl group.

As an example, the wetting agent known commercially as Igepon A is made by condensing oleyl chloride with ethionic acid.

A similar wetting agent is obtained by condensing 1 mol. of oleic acid with 1 mol. of ethylene glycol and treating the resulting ether with sulfonic acid.

Fatty acid amide derivatives may be represented by the general formula $$RCONHC_2H_4SO_3Na$$

in which R stands for an alkyl group. As an example the wetting agent known commercially as Igepon T is obtained by condensing oleic acid with taurine.

Other wetting agents may be substituted but it is preferred that such agents as are chosen should be at least substantially incapable of causing undesirable chemical reactions to take place in the system.

It will be noted that the materials particularly set forth above are all organic in character.

The reactivation of the oxide whether by spraying or fogging of water or by steaming or otherwise may be continuous or discontinuous as desired.

For instance a small amount of water to which a suitable wetting agent has been added might be continuously injected either in the liquid or in the vapor phase into the gas stream just ahead of the purifier boxes or might be injected directly into such boxes.

On the other hand the treatment might be discontinuous and applied at suitable intervals as desired, either with or without taking the purifier off stream.

It is, of course, understood that water injected in the vapor phase (steam) will condense on the oxide in the purifier boxes. In this case the wetting agent will usually be applied in the form of a fog or might have been previously applied, for instance, in solution in water or otherwise.

It is conceivable that the wetting agent might be applied directly to the purification mass if proper distribution is possible.

The quantity of water to be injected to obtain optimum results will, of course, depend upon the dryness of the gas, the dryness of the oxide as well as the character of the oxide, that is whether it will operate efficiently with a narrow or wide range in water content. However, when an oxide has become dried the injection of some water in accordance with my invention will effect a very definite improvement and, by following the results obtained in any particular system upon increasing and decreasing the quantity or rate of injection of water, optimum operating conditions may be readily chosen.

It will be obvious that the oxide may be treated in situ or may be removed and then treated, or otherwise as desired.

Since difficulty is sometimes experienced in physically adding the proper amount of water to dry powdered oxide and wood shavings in the initial preparation of the purification mass, my process may be used in such cases to expedite the manufacture.

The term "wetting agent" as used in the claims is intended to mean a substance which is characterized by its ability to substantially reduce the surface tension when added to water in relatively small quantities.

It is to be understood that the above particular description is by way of illustration and that changes, omissions, additions, substitutions and/or modifications may be made therein without in the scope of the claims without departing from the spirit of the invention which is intended to be limited only as required by the prior art.

I claim:

1. A method for reconditioning dehydrated unspent iron oxide while in use in a dry purification system for dry manufactured gas, comprising spraying onto said dehydrated oxide while said dry gas is passing therethrough a mixture of water and a wetting agent, said wetting agent bringing said water into contact with said dehydrated oxide in a manner to rehydrate said oxide.

2. In a method for the purification of a manufactured gas having a relatively low moisture content in which said gas is passed through a dry purification system containing iron oxide which has lost at least a part of its water of hydration due to the dryness of said gas, the step of bringing into contact with said oxide while said gas is passing therethrough water to which has been added a wetting agent.

3. A method for treating iron oxide which has become dehydrated in a dry purification system as a result of passing dry manufactured gas therethrough, comprising contacting said oxide with water in the presence of an organic wetting agent.

4. A method for purifying dry manufactured gas comprising passing said dry gas through a mass of fluffed iron oxide in the presence of water and a relatively small quantity of an organic wetting agent, said water being present in sufficient amount to maintain a major part of said oxide in hydrated condition.

5. A method for treating iron oxide which has become dehydrated in a dry purification system as a result of passing dry manufactured gas therethrough, comprising contacting said oxide with water in the presence of an organic wetting agent, said organic wetting agent having the formula $$RCH_2OSO_3Na$$

in which R stands for an alkyl group.

6. A method for treating iron oxide which has become dehydrated in a dry purification system as a result of passing dry manufactured gas therethrough, comprising contacting said oxide with water in the presence of an organic wetting agent, said organic wetting agent having the formula $RCOC_2H_4SO_3Na$ in which R stands for an alkyl group.

7. A method for treating iron oxide which has become dehydrated in a dry purification system as a result of passing dry manufactured gas therethrough, comprising contacting said oxide with water in the presence of an organic wetting agent, said organic wetting agent having the formula $RCONHC_2H_4SO_3Na$ in which R stands for an alkyl group.

CLAUDE W. JORDAN.